US010425220B2

(12) United States Patent
Tsai et al.

(10) Patent No.: US 10,425,220 B2
(45) Date of Patent: Sep. 24, 2019

(54) METHOD FOR RECEIVING AND TRANSMITTING SYNCHRONIZATION SIGNAL AND WIRELESS COMMUNICATION DEVICE

(71) Applicant: INDUSTRIAL TECHNOLOGY RESEARCH INSTITUTE, Hsinchu (TW)

(72) Inventors: Hua-Lung Tsai, Taipei (TW); Chorng-Ren Sheu, Kaohsiung (TW); Chun-Yi Wei, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 96 days.

(21) Appl. No.: 15/391,508

(22) Filed: Dec. 27, 2016

(65) Prior Publication Data

US 2017/0331620 A1    Nov. 16, 2017

Related U.S. Application Data

(60) Provisional application No. 62/335,116, filed on May 12, 2016, provisional application No. 62/372,329, filed on Aug. 9, 2016.

(51) Int. Cl.
*H04L 7/04* (2006.01)
*H04L 12/801* (2013.01)
(Continued)

(52) U.S. Cl.
CPC ............. *H04L 7/042* (2013.01); *H04L 47/17* (2013.01); *H04L 47/29* (2013.01); *H04W 56/00* (2013.01);
(Continued)

(58) Field of Classification Search
None
See application file for complete search history.

(56) References Cited

U.S. PATENT DOCUMENTS 7,729,336 B2   6/2010  Pun et al.
8,374,163 B2   2/2013  Horn et al.
(Continued)

FOREIGN PATENT DOCUMENTS

CN    104811925 A    7/2015
CN    105101391 A    11/2015
(Continued)

OTHER PUBLICATIONS

A. Bhamri et al., "Primary Synchronization Signal Detection Method for Device-to-Device in LTE-Rel 12 and Beyond," 2015 IEEE 82nd Vehicular Technology Conference (VTC2015—Fall), Boston, MA, 2015, pp. 1-5.*

(Continued)

*Primary Examiner* — Berhanu Tadese
(74) *Attorney, Agent, or Firm* — Birch, Stewart, Kolasch & Birch, LLP

(57) ABSTRACT

A method for receiving and transmitting synchronization signal is provided. The method is applicable to a wireless communication device. The wireless communication device has a local timing. The method includes the following steps. Receive at least one synchronization signal. If a signal power of at least one of the at least one synchronization signal is greater than or equal to a signal power threshold, select one of the at least one synchronization signal as a reference synchronization signal according to a priority rule, and synchronize the local timing to the reference synchronization signal. If the signal power of each the synchronization signal is less than the signal power threshold, send a local synchronization signal according to the local timing. If the reference synchronization signal meets a forwarding (Continued)

criterion, forward the reference synchronization signal, wherein the forwarding criterion includes a power constraint and a hop count constraint.

26 Claims, 6 Drawing Sheets

(51) Int. Cl.
 *H04W 56/00* (2009.01)
 *H04W 84/00* (2009.01)
(52) U.S. Cl.
 CPC ....... *H04W 56/0015* (2013.01); *H04W 84/00* (2013.01)

(56) References Cited

U.S. PATENT DOCUMENTS

| | | | |
|---|---|---|---|
| 9,167,544 | B2 | 10/2015 | Zheng et al. |
| 9,603,127 | B2* | 3/2017 | Kim .................. H04W 76/14 |
| 2013/0308445 | A1* | 11/2013 | Xiang ............... H04W 28/0231 370/230 |
| 2014/0335853 | A1* | 11/2014 | Sartori .............. H04W 56/0015 455/426.1 |
| 2015/0009949 | A1 | 1/2015 | Khoryaev et al. |
| 2015/0215903 | A1* | 7/2015 | Zhao .................. H04W 72/04 370/329 |
| 2015/0327195 | A1* | 11/2015 | Chiu .................. H04W 56/002 370/350 |
| 2015/0382315 | A1 | 12/2015 | Sorrentino et al. |
| 2016/0037466 | A1* | 2/2016 | Yang .................. H04W 48/14 370/350 |
| 2016/0044618 | A1* | 2/2016 | Sheng ................ H04W 56/002 370/329 |
| 2016/0066174 | A1* | 3/2016 | Kim .................. H04W 8/005 455/41.2 |
| 2016/0095125 | A1* | 3/2016 | Park .................. H04W 8/02 370/329 |
| 2016/0128009 | A1* | 5/2016 | Yoon .................. H04W 4/70 370/350 |
| 2016/0212721 | A1* | 7/2016 | Sheng ................ H04W 76/14 |
| 2016/0278003 | A1* | 9/2016 | Kim .................. H04W 48/16 |
| 2016/0295624 | A1* | 10/2016 | Novlan .............. H04W 76/14 |
| 2016/0302250 | A1* | 10/2016 | Sheng ................ H04W 4/70 |
| 2016/0330780 | A1* | 11/2016 | Kim .................. H04W 48/16 |
| 2016/0353478 | A1* | 12/2016 | Kim .................. H04W 72/12 |
| 2016/0360541 | A1* | 12/2016 | Kim .................. H04W 72/0406 |
| 2016/0373915 | A1* | 12/2016 | Kim .................. H04W 76/14 |
| 2016/0381672 | A1* | 12/2016 | Kim .................. H04W 72/048 370/329 |
| 2016/0381690 | A1* | 12/2016 | Kim .................. H04W 72/08 370/329 |
| 2017/0012753 | A1* | 1/2017 | Kim .................. H04W 76/14 |
| 2017/0013628 | A1* | 1/2017 | Kim .................. H04J 11/0026 |
| 2017/0019937 | A1* | 1/2017 | Kim .................. H04W 8/26 |
| 2017/0027013 | A1* | 1/2017 | Kim .................. H04W 72/04 |
| 2017/0034688 | A1* | 2/2017 | Kim .................. H04W 76/14 |
| 2017/0041773 | A1* | 2/2017 | Fujishiro ........... H04W 8/005 |
| 2017/0041971 | A1* | 2/2017 | Kim .................. H04W 76/14 |
| 2017/0048829 | A1* | 2/2017 | Kim .................. H04W 72/042 |
| 2017/0078863 | A1* | 3/2017 | Kim .................. H04W 48/16 |
| 2017/0142741 | A1* | 5/2017 | Kaur .................. H04W 56/002 |
| 2017/0188391 | A1* | 6/2017 | Rajagopal ......... H04W 74/0816 |
| 2017/0215119 | A1* | 7/2017 | Hong ................. H04W 36/08 |
| 2017/0230956 | A1* | 8/2017 | Kim .................. H04B 1/713 |
| 2017/0231023 | A1* | 8/2017 | Adachi ............... H04W 28/06 |

FOREIGN PATENT DOCUMENTS

| | | | | |
|---|---|---|---|---|
| CN | 105101394 | A | 11/2015 | |
| CN | 105164951 | A | 12/2015 | |
| CN | 105517139 | A | 4/2016 | |
| EP | 2900022 | A1 * | 7/2015 | ........... H04W 52/30 |
| EP | 2900022 | A1 * | 7/2015 | ........... H04W 52/30 |
| EP | 3094142 | A1 * | 11/2016 | ......... H04W 56/001 |
| EP | 3094142 | A1 * | 11/2016 | ......... H04W 56/001 |
| JP | WO 2014069064 | A1 * | 5/2014 | ........ H04W 36/0094 |
| TW | 201507536 | A | 2/2015 | |
| TW | 201545587 | A | 12/2015 | |
| WO | WO 2011094644 | A1 * | 8/2011 | ........ H04W 36/0083 |
| WO | WO-2011094644 | A1 * | 8/2011 | ...... H04W 36/00837 |
| WO | WO-2014069064 | A1 * | 5/2014 | ........ H04W 36/0094 |
| WO | WO-2014182342 | A1 * | 11/2014 | ........... H04W 48/14 |
| WO | 2016/056877 | A2 | 4/2016 | |
| WO | WO 2016163834 | A1 * | 10/2016 | ........... H04W 40/08 |
| WO | WO-2016163834 | A1 * | 10/2016 | ........... H04W 40/08 |

OTHER PUBLICATIONS

3GPP TS 36.331 V11.1.0 , Sep. 26, 2012, Sections: 5.5.4_ Measurement report triggering & 5.5.5_Measurement reporting.—Internet Citation—from http://www.qtc.jp/3GPP/Specs/36331-b10.pdf.*
3GPP, "3rd Generation Partnership Project; Technical Specification Group Radio Access Network; Study on LTE-based V2X Services; (Release 14)," 3GPP TR 36.885 V2.0.0, Jun. 2016, pp. 1-220.
Jiang et al., "Research of synchronization and training sequence design for cooperative D2D communications underlaying hyper-cellular networks," IEEE International Conference on Communications 2013—CoCoNet5, pp. 271-275.
Kim et al., "Design of synchronization preambles for LTE-Advanced D2D communications," Sixth International Conference on Ubiquitous and Future Networks (ICUFN) 2014, pp. 138-139.
Lee et al., "A carrier frequency synchronization method for device-to-device communication network," 2013 19th Asia-Pacific Conference on Communications (APCC), pp. 239-244.
Lee et al., "A fine timing synchronization method on group communication system enablers for LTE," 2013 19th Asia-Pacific Conference on Communications (APCC), pp. 21-25.
Sun et al., "Distributed clock synchronization with application of D2D communication without infrastructure," IEEE Globecom 2013 Workshops, pp. 561-566.
Sun et al., "Support for Vehicle-to-Everything Services Based on LTE," IEEE Wireless Communications, vol. 23, Issue 3, Jun. 24, 2016, pp. 4-8.
Taiwanese Office Action and Search Report for Taiwanese Application No. 105137255, dated Mar. 16, 2018.
Chinese Office Action and Search Report for Chinese Application No. 201611170403.6, dated Apr. 26, 2019.

* cited by examiner

METHOD FOR RECEIVING AND TRANSMITTING SYNCHRONIZATION SIGNAL AND WIRELESS COMMUNICATION DEVICE

CROSS-REFERENCE TO RELATED APPLICATION

This application claims the benefit of U.S. provisional application Ser. No. 62/335,116, filed May 12, 2016, U.S. provisional application Ser. No. 62/372,329, filed Aug. 9, 2016, and Taiwan application Serial No. 105137255, filed on Nov. 15, 2016, the subject matters of which are incorporated herein by references.

TECHNICAL FIELD

The disclosure relates to a method for selecting and forwarding synchronization signal, and a communication device using the method.

BACKGROUND

Device to device (D2D) communication, or sidelink communication, refers to a direct communication mechanism between two user equipments (UE) without traversing a base station (BS). In order to synchronize a D2D device to the network or another device, a D2D synchronization signal may be transmitted from a synchronization source to align the timing among multiple devices. In a network consisting of D2D devices, a D2D device may receive multiple synchronization signals simultaneously. Thus there is a need for a method for selecting and forwarding the synchronization signal.

SUMMARY

The disclosure relates to a method for receiving and transmitting synchronization signal and a communication device.

According to one embodiment, a method for receiving and transmitting synchronization signal is provided. The method is applicable to a wireless communication device. The wireless communication device has a local timing. The method for receiving and transmitting synchronization signal includes the following steps. Receive at least one synchronization signal. If a signal power of at least one of the at least one synchronization signal is greater than or equal to a signal power threshold, select one of the at least one synchronization signal as a reference synchronization signal according to a priority rule, and synchronize the local timing to the reference synchronization signal. If the signal power of each the synchronization signal is less than the signal power threshold, send a local synchronization signal according to the local timing. If the reference synchronization signal meets a forwarding criterion, forward the reference synchronization signal, wherein the forwarding criterion includes a power constraint and a hop count constraint.

According to one embodiment, a wireless communication device is provided. The wireless communication device has a local timing. The wireless communication device includes a signal transceiver and a processor. The signal transceiver is configured to receive at least one synchronization signal. The processor is coupled to the signal transceiver. The processor is configured to perform the following operations: if determining that a signal power of at least one of the at least one synchronization signal is greater than or equal to a signal power threshold, selecting one of the at least one synchronization signal as a reference synchronization signal according to a priority rule, and synchronizing the local timing to the reference synchronization signal; if determining that the signal power of each the synchronization signal is less than the signal power threshold, sending a local synchronization signal according to the local timing by the signal transceiver; and if determining that the reference synchronization signal meets a forwarding criterion, forwarding the reference synchronization signal by the signal transceiver, wherein the forwarding criterion includes a power constraint and a hop count constraint.

Figure 1:
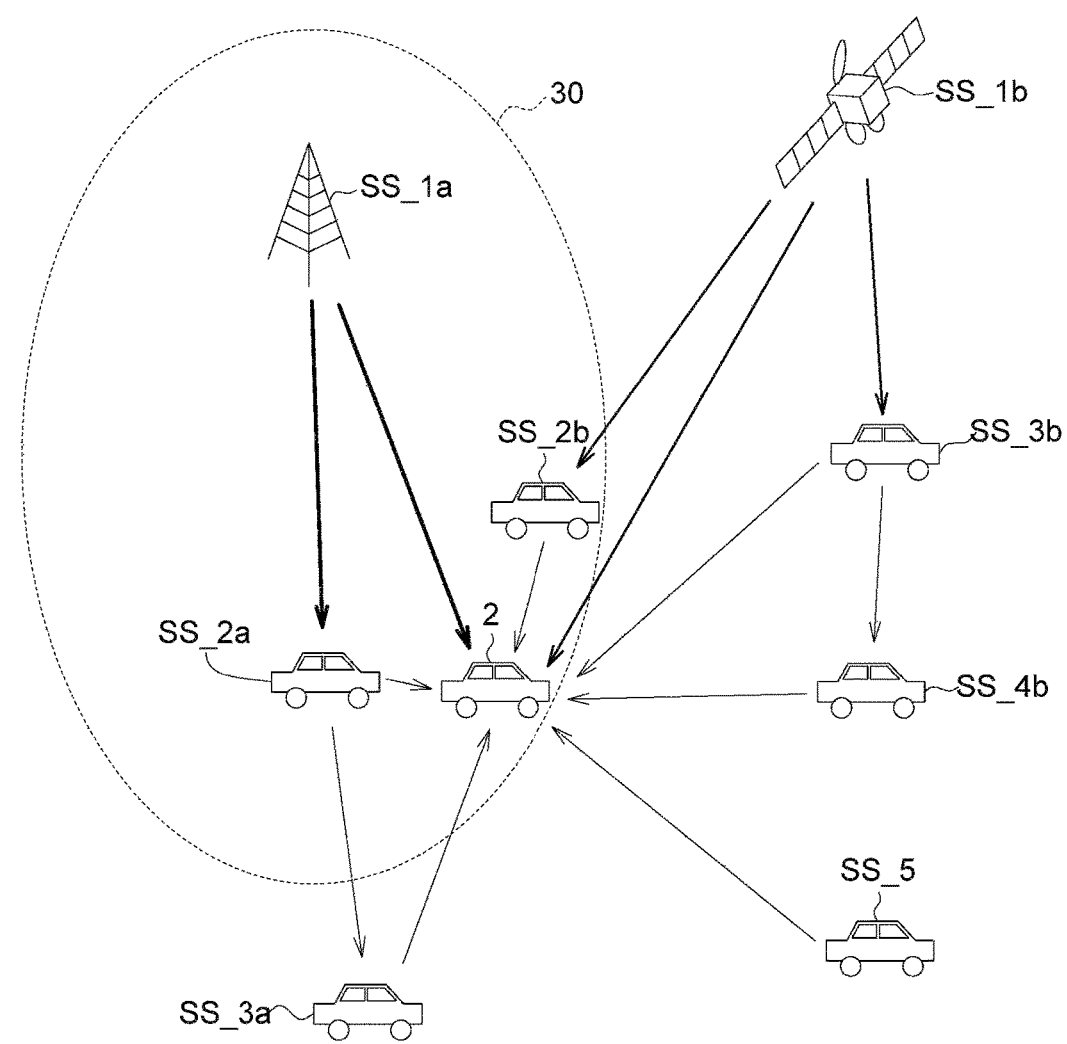
FIG. 1 shows a diagram of a wireless communication system according to an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram of a wireless communication system according to an embodiment of this disclosure. The wireless communication system 1 includes a wireless communication device 2 and multiple synchronization sources SS1_a, SS_1b, SS_2a, SS_2b, SS_3a, SS_3b, SS_4b, and SS_5. The wireless communication device 2 may be a mobile device such as a cellphone, a tablet computer, or a car capable of performing wireless communication as shown in FIG. 1. The application of D2D technology on the car related communication may also be referred as Vehicle-to-Vehicle (V2V) technology.

The synchronization source SS1_a is a base station, capable of providing a coverage 30 to serve multiple user equipments. In this example, the synchronization sources SS_2a, SS_2b and the wireless communication device 2 are user equipments in the coverage 30 (also referred as "in coverage" in the following description). The synchronization sources SS_3a, SS_3b, SS_4b, SS_5 are user equipments out of the coverage 30 (also referred as "out of coverage" in the following description). The synchronization source SS_1a is for example a base station providing mobile network service. The coverage 30 is related to the signal transmission power of the synchronization source SS_1a and its surrounding geographic environment. The wireless communication technology adopted by the synchronization source SS_1a may be Long Term Evolution (LTE). The synchronization source SS_1a may be an evolved node B (eNB). The wireless communication device 2 is in the coverage 30 in the example shown in FIG. 1. However, in the following embodiments, the wireless communication device 2 may also be out of the coverage 30.

The synchronization source SS_1b is a global navigation satellite system (GNSS). The global navigation satellite system may include multiple satellites spread over the earth orbit to provide accurate positioning information, speed information, and timing reference. The global navigation satellite system may be for example Global Positioning System (GPS), BeiDou Navigation Satellite System (BDS), GLONASS, Galileo, or other navigation satellite system providing positioning and timing information.

As shown in FIG. 1, the wireless communication device 2 receives multiple synchronization signals from multiple synchronization sources SS1_a, SS_1b, SS_2a, SS_2b, SS_3a, SS_3b, SS_4b, and SS_5. Each synchronization signal is sent from a transmission source, and the transmission source may be a base station (SS_1a), a global navigation satellite system (SS_1b), or a user equipment (SS_2a, SS_2b, SS_3a, SS_3b, SS_4b, SS_5). The method for selecting and forwarding multiple synchronization signals is described below. Although LTE is used as an example of the wireless communication technology standard, eNB is used as an example of a base station, and communication between cars is used as an example in the following description, the disclosure is not limited thereto. The method for receiving and transmitting synchronization signal disclosed in the following embodiments may also be applied to other mobile network communication system, and the cars in the example may also be cellphones, tablet computers, laptop computers, and other types of user equipments.

Figure 2:
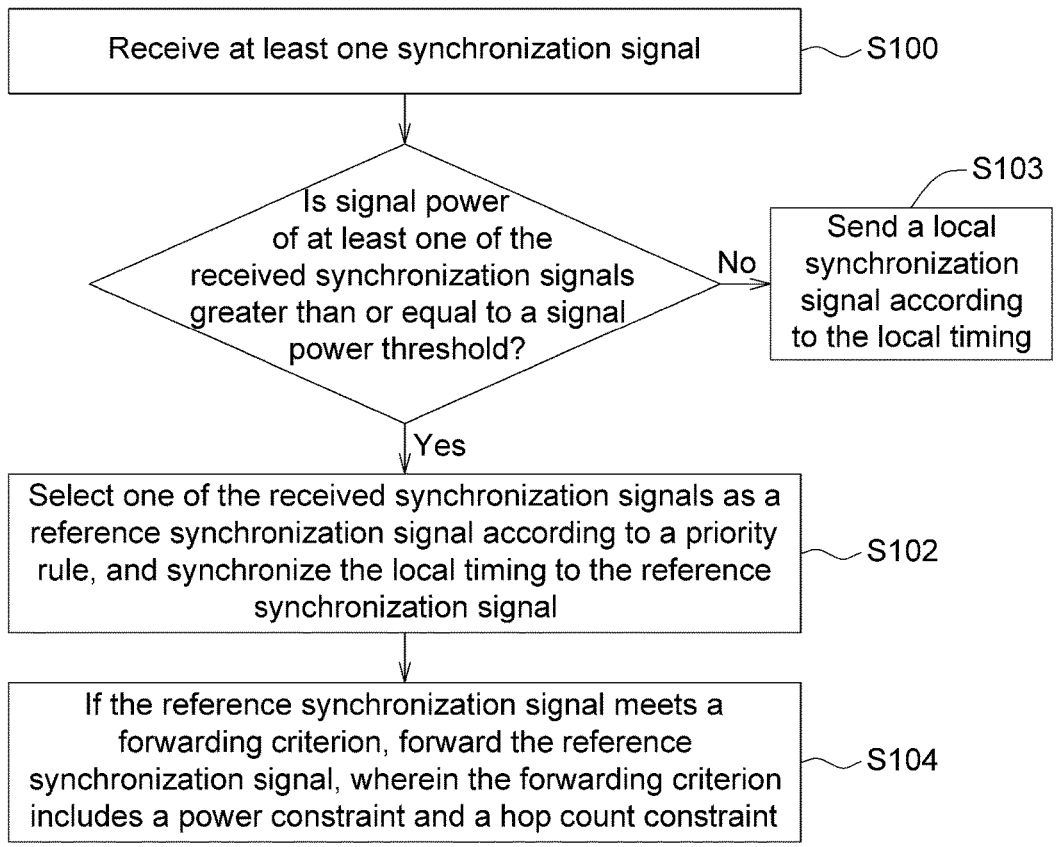
FIG. 2 shows a flowchart illustrating a method for receiving and transmitting synchronization signal according to an embodiment of this disclosure.

FIG. 2 shows a flowchart illustrating a method for receiving and transmitting synchronization signal according to an embodiment of this disclosure. The method is applicable to a wireless communication device. The wireless communication device has a local timing. The method for receiving and transmitting synchronization signal includes the following steps. Step S100: Receive at least one synchronization signal. If a signal power of at least one of the received synchronization signals is greater than or equal to a signal power threshold, perform step S102: select one of the received synchronization signals as a reference synchronization signal according to a priority rule, and synchronize the local timing to the reference synchronization signal. If the signal power of each the synchronization signal is less than the signal power threshold, perform step S103: send a local synchronization signal according to the local timing. After step S103, perform step S104: If the reference synchronization signal meets a forwarding criterion, forward the reference synchronization signal, wherein the forwarding criterion includes a power constraint and a hop count constraint.

Figure 3:
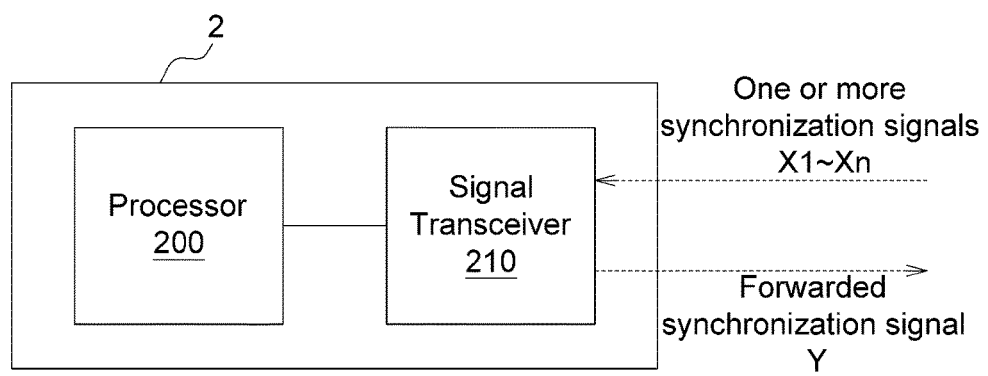
FIG. 3 shows a block diagram of a wireless communication device according to an embodiment of this disclosure.

FIG. 3 shows a block diagram of a wireless communication device according to an embodiment of this disclosure. The wireless communication device 2 has a local timing. The wireless communication device 2 includes a signal transceiver 210 and a processor 200. The signal transceiver 210 is configured to receive at least one synchronization signal X1-Xn (n is a positive integer greater than or equal to 1). The processor 200 is coupled to the signal transceiver 210. The processor 200 is configured to perform the following operations: if determining that a signal power of at least one of the synchronization signals X1-Xn is greater than or equal to a signal power threshold Pt, selecting one of the synchronization signals X1-Xn as a reference synchronization signal Xs according to a priority rule, and synchronizing the local timing to the reference synchronization signal Xs; if determining that the signal power of each the synchronization signal X1-Xn is less than the signal power threshold Pt, sending a local synchronization signal according to the local timing by the signal transceiver 210; and if determining that the reference synchronization signal Xs meets a forwarding criterion, forwarding the reference synchronization signal Xs by the signal transceiver 210, wherein the forwarding criterion includes a power constraint and a hop count constraint.

Refer to FIG. 1, FIG. 2, and FIG. 3, the wireless communication device 2 receives multiple synchronization signals X1-Xn (step S100), such as from multiple synchronization sources SS1_a, SS_1b, SS_2a, SS_2b, SS_3a, SS_3b, SS_4b, and SS_5. First the wireless communication device 2 determines whether or not the signal power of the received signal is strong enough. If the signal power is too weak, the reliability of this synchronization signal may be too low, and thus the wireless communication device 2 does not use the synchronization signal having a signal power that is too low as the basis for timing synchronization. In one embodiment, a signal power threshold Pt may be preset. If the signal power of at least one of the synchronization signals X1-Xn is greater than or equal to the signal power threshold Pt, one of the synchronization signals may be selected as the reference synchronization signal Xs, and the local timing of the wireless communication device 2 may be synchronized to the reference synchronization signal Xs (Step S102). The wireless communication device 2 may calculate the reference signal received power (RSRP) or the sidelink reference signal received power (S-RSRP) to determine whether or not the signal power of the received synchronization signal X1-Xn is strong enough.

In one embodiment, if the signal power of each the synchronization signal X1-Xn is less than the signal power threshold, it represents that the wireless communication device 2 does not receive a synchronization signal that is reliable enough, or there is no other reliable synchronization source near the wireless communication device 2. In this case, the wireless communication device 2 does not select a reference synchronization signal from these synchronization signals X1-Xn. Instead, the wireless communication device 2 acts as an independent synchronization source, and sends a local synchronization signal according to the local timing (step S103). As shown in FIG. 3, in this situation the synchronization signal Y sent from the wireless communication device 2 is generated according to the local timing.

After selecting the reference synchronization signal Xs in the step S102, the wireless communication device 2 determines whether or not to forward the reference synchronization signal Xs. A forwarding criterion may be preset or adjusted dynamically. The forwarding criterion may be related to the signal power and the hop count. The hop count may represent a number of forwarding operations that the reference synchronization signal Xs has experienced after being sent from the base station (the synchronization source SS_1a) or the global navigation satellite system (the synchronization source SS_1b). In general, the reliability of a synchronization signal decreases as the number of forwarding operations increases. In step S104, after determining that the reference synchronization signal Xs meets the forwarding criterion, the wireless communication device 2 forwards the reference synchronization signal Xs. In one embodiment, after determining that the reference synchronization signal Xs does not meet the forwarding criterion, the wireless communication device 2 synchronizes to the reference synchronization signal Xs but does not forward the reference synchronization signal Xs.

Because the base station, the GNSS, and the user equipment are used in different applications, their signal power range may be different. In one embodiment, the power constraint in the forwarding criterion may be determined according to the transmission source of the reference synchronization signal Xs. For example, the transmission source of the reference synchronization signal Xs may be the base station (the synchronization source SS_1a), the GNSS (the synchronization source SS_1b), or user equipment (the synchronization source SS_2a, SS_2b, SS_3a, SS_3b, SS_4b, SS_5). Different power constraint may be assigned correspondingly for determining whether the reference synchronization signal Xs meets the forwarding criterion.

In one embodiment, the forwarding criterion includes: the signal power of the reference synchronization signal Xs is between a power lower bound Pa and a power upper bound Pb, and the hop count of the reference synchronization signal Xs is less than a hop count threshold Ht. The power lower bound Pa, the power upper bound Pb, and the hop count threshold Ht may be preset values. If the signal power of the reference synchronization signal Xs is less than the power lower bound Pa, the reliability of the reference synchronization signal Xs is not good enough, and hence the reference synchronization signal Xs is not forwarded. On the other hand, if the signal power of the reference synchronization signal Xs is greater than the power upper bound Pb, the quality of the reference synchronization signal Xs is still good enough, and hence the user equipments near the wireless communication device 2 may possibly be able to receive the reference synchronization signal Xs. Therefore the reference synchronization signal Xs is not forwarded to prevent signal collision due to too many synchronization signals in the environment, which may cause timing confusion and difficulty in the determining process. If the hop count of the reference synchronization signal Xs is greater than the hop count threshold Ht, it represents that the reference synchronization signal Xs has experienced too many forwarding operations, and thus the signal reliability may be degraded, and hence the reference synchronization signal Xs is not forwarded.

As described above, the power constraint of the forwarding criterion may be determined by the transmission source of the reference synchronization signal Xs. For different transmission sources, the power lower bound Pa and the power upper bound Pb may be different. For example, if the reference synchronization signal Xs is primary synchronization signal (PSS) and secondary synchronization signal (SSS) directly from the eNB, a power lower bound Pa_eNB and a power upper bound Pb_eNB which are related to the enB may be used to determine whether or not the forwarding criterion is met. If the reference synchronization signal Xs is directly from the GNSS, a power lower bound Pa_GNSS and a power upper bound Pb_GNSS which are related to the GNSS may be used to determine whether or not the forwarding criterion is met. If the reference synchronization signal Xs is from other user equipments (either forwarded or sent independently), a power lower bound Pa_SL and a power upper bound Pb_SL which are related to sidelink may be used to determine whether or not the forwarding criterion is met.

As shown in FIG. 2, when the reference synchronization signal Xs meets the forwarding criterion, the forwarded synchronization signal Y sent by the wireless communication device 2 may be set (such as setting the timing information) according to the reference synchronization signal Xs. As being forwarded by the wireless communication device 2, the hop count of the forwarded synchronization signal Y may increase by 1. Other user equipments may receive the forwarded synchronization signal Y sent by the wireless communication device 2 and perform the method for receiving and transmitting synchronization signal as shown in FIG. 2.

Figure 4:
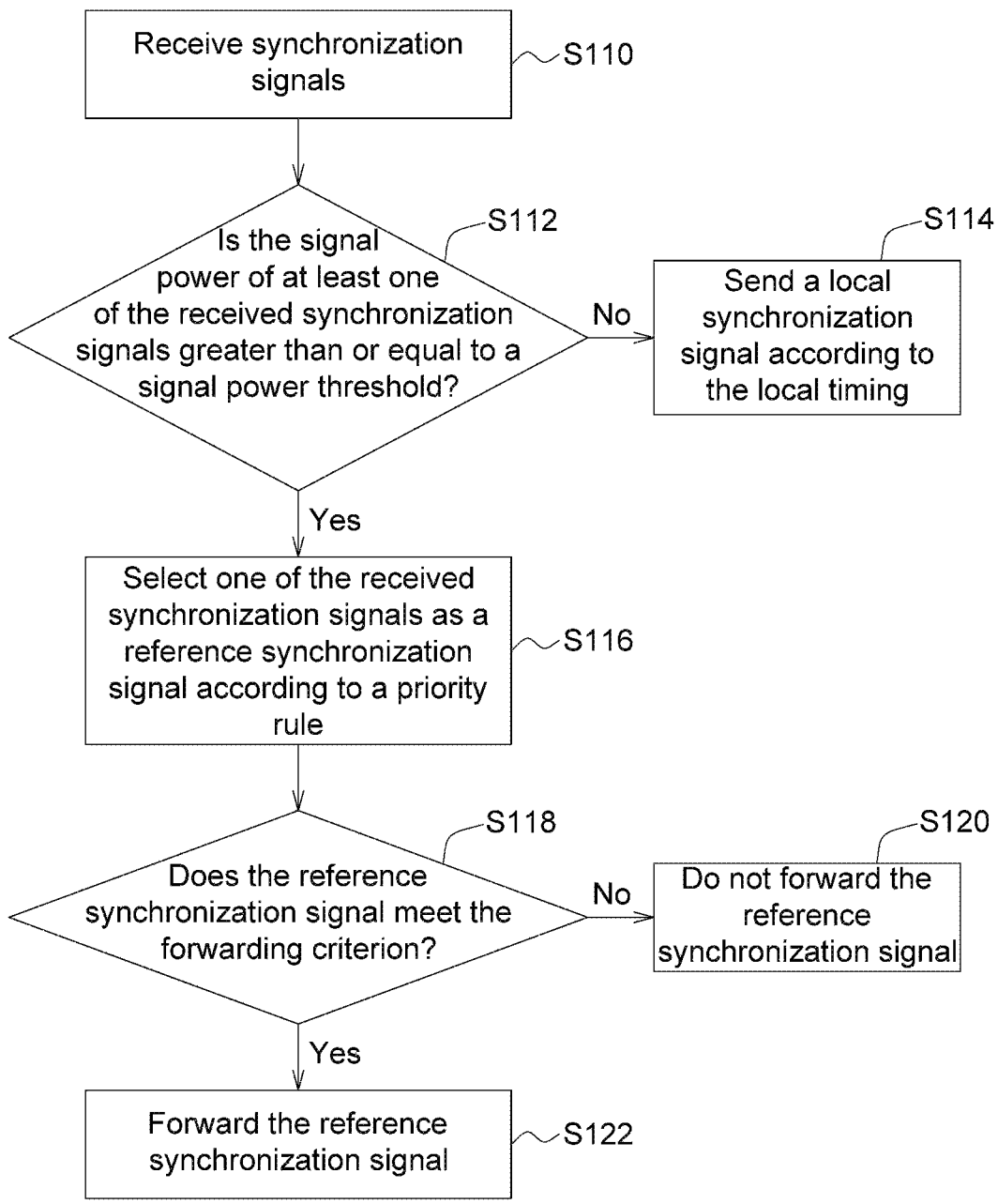
FIG. 4 shows a flowchart illustrating a method for selecting and forwarding synchronization signal according to an embodiment of this disclosure.

FIG. 4 shows a flowchart illustrating a method for selecting and forwarding synchronization signal according to an embodiment of this disclosure. In this embodiment, the method includes the following steps. Step S110: receive one or more synchronization signals. Step S112: Determine whether or not the signal power of at least one of the received synchronization signals is greater than or equal to a signal power threshold. If not, proceed to step S114: send a local synchronization signal according to the local timing. If yes, proceed to step S116: select one of the received synchronization signals as a reference synchronization signal Xs according to a priority rule. Step S118: determine whether or not the reference synchronization signal Xs meets the forwarding criterion. If not, proceed to step S120: do not forward the reference synchronization signal Xs. If yes, proceed to step S122: forward the reference synchronization signal Xs. Each step may be referred to the description given in the above embodiments and thus is not repeated here.

In the step S102 in FIG. 2 and the step S116 in FIG. 4 of synchronization signal selection, the multiple synchronization signals X1-Xn may be sorted in priority according to a priority rule, and one of the multiple synchronization signals X1-Xn may be selected as the reference synchronization signal Xs correspondingly. There may be several different implementations about the priority rule, and some embodiments are given below.

As shown in FIG. 1, the synchronization signal transmitted from each synchronization source may be categorized into base station related, GNSS related, and independent synchronization source. For example, the synchronization source SS_1a, SS_2a, SS_3a is either a base station itself or forwarded from a base station, and thus may be categorized as base station related. The synchronization source SS_1b, SS_2b, SS_3b, SS_4b is either a GNSS itself or forwarded from a GNSS, and thus may be categorized as GNSS related. The synchronization source SS_5 is an independent synchronization source. The category that the received synchronization signal belongs to may be determined by for example the signal format or indicators in the signal. Different priority order may be assigned to different categories of the synchronization signal. For example, a synchronization signal related to the base station may be assigned a higher priority, or a synchronization signal related to the GNSS may be assigned a higher priority.

In one embodiment, if the wireless communication device 2 is in the coverage 30 of the base station, the base station (for example, the synchronization source SS_1a) may transmit a synchronization source indicator si to the wireless communication device 2 in the coverage 30. The synchronization source indicator si indicates the wireless communication device 2 either to prioritize a synchronization signal related to the base station or to prioritize a synchronization signal related to the GNSS. The synchronization source indicator si may be transmitted via the system information block (SIB) or the control channel from the base station to the wireless communication device 2 in the coverage 30. For example, prioritize the synchronization signal related to the base station if synchronization source indicator si=1, and prioritize the synchronization signal related to the GNSS if synchronization source indicator si=0. User equipment out of the coverage 30 does not receive the synchronization source indicator si.

In one embodiment, the priority rule includes: assigning a higher priority order to a synchronization signal whose transmission source is in the coverage of the base station than to a synchronization signal whose transmission source is out of the coverage of the base station. As shown in FIG. 1, the synchronization sources SS_1$a$, SS_2$a$, SS_2$b$ are in the coverage 30, and are assigned a higher priority order. The synchronization sources SS_3$a$, SS_1$b$, SS_3$b$, SS_4$b$, SS_5 are out of the coverage 30, and are assigned a lower priority order. There may be an indicator in the synchronization signal transmission channel, such as the physical sidelink broadcasting channel (PSBCH), to indicate whether in coverage or out of coverage, such that the wireless communication device 2 that receives the synchronization signal is able to assign priority order correspondingly.

In one embodiment, the priority rule includes: based on the hop count of the synchronization signal, sorting the hop count in an ascending order, and assigning a higher priority order to a synchronization signal having the smaller hop count than to a synchronization signal having the larger hop count. That is, prioritize a signal with smaller hop count since smaller hop count generally corresponds to higher signal reliability. In one embodiment, the priority rule includes: based on the signal power of the synchronization signal, sorting the signal power in a descending order, and assigning a higher priority order to a synchronization signal having the larger signal power than to a synchronization signal having the smaller signal power. That is, prioritize a signal with larger signal power.

It should be noted that one priority rule may be chosen from the multiple priority rules mentioned in the above embodiments, or several priority rules may be combined together and arranged in an appropriate order. For example, an example priority rule may be: first select in coverage signals prior to out of coverage signals. After multiple synchronization signals are selected, prioritize signal with smaller hop count over signal with larger hop count. Another example of priority rule may be: first select base station related signals prior to GNSS related signals. After multiple synchronization signals are selected, prioritize signal with larger signal power over signal with smaller signal power. In implementation it is not limited how the priority rules in those embodiments are combined.

Figure 5:
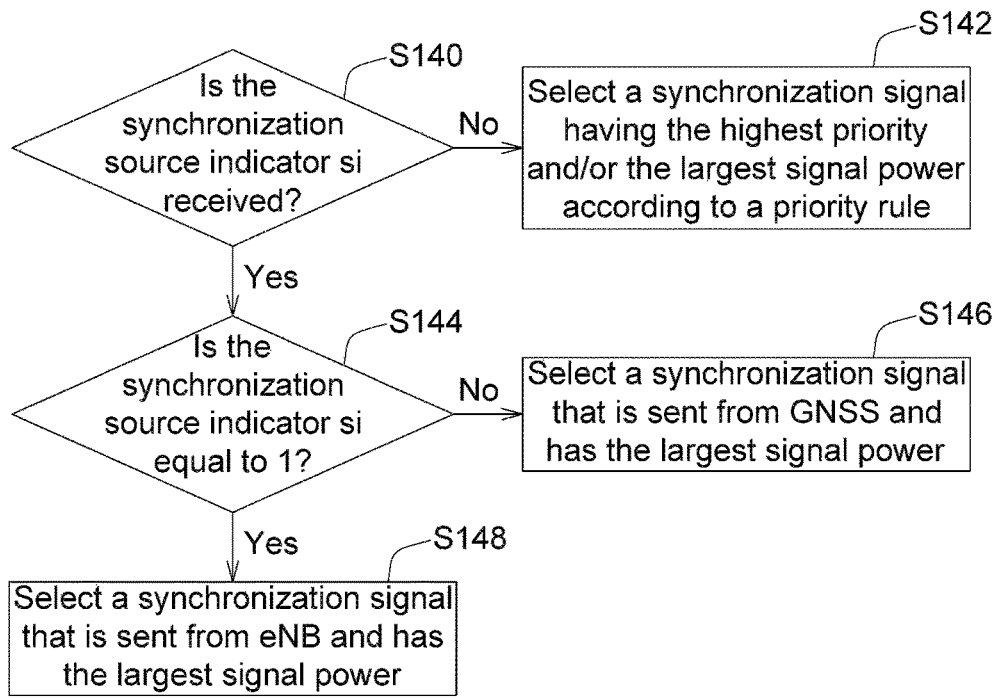
FIG. 5 shows a flowchart illustrating a method for selecting the reference synchronization signal based on the synchronization source indicator according to an embodiment of this disclosure.

One example is given below to illustrate the selection of reference synchronization signal by combining multiple priority rules. FIG. 5 shows a flowchart illustrating a method for selecting the reference synchronization signal based on the synchronization source indicator according to an embodiment of this disclosure. Step S140: the wireless communication device 2 determines whether or not the synchronization source indicator is received. If not, perhaps the wireless communication device 2 is not in the coverage of the base station, or the base station does not transmit the synchronization source indicator. In this situation, proceed to step S142: select a synchronization signal having the highest priority and/or the largest signal power according to the priority rule (which may be preset). The several embodiments of the priority rule are not repeated here. If the synchronization source indicator is received in the step S140, proceed to step S144: determine whether or not the synchronization source indicator si is equal to 1. If not, proceed to step S146: select a synchronization signal that is sent from GNSS and has the largest signal power. If yes, proceed to step S148: select a synchronization signal that is sent from eNB and has the largest signal power.

Different reference synchronization signal selection results may be obtained with different priority rules. For example, if the priority rule adopted is: prioritizing in coverage over out of coverage, prioritizing small hop count over large hop count, there may be several scenarios when this priority rule is applied to the wireless communication system shown in FIG. 1. (The symbols > and = will be used in the following description to represent the priority order. SS_1$a$>SS_2$a$ means SS_1$a$ has higher priority than SS_2$a$. SS_2$a$=SS_2$b$ means SS_2$a$ and SS_2$b$ have equal priority.)

Scenario 1: considering only the synchronization signals related to eNB. The priority order is: SS_1$a$>SS_2$a$>SS_3$a$.

Scenario 2: considering only the synchronization signals related to GNSS. The priority order is: SS_1$b$>SS_2$b$>SS_3$b$>SS_4$b$. The synchronization source SS_2$b$ has higher priority than the synchronization source SS_3$b$ since the synchronization source SS_2$b$ is in the coverage of the base station.

Scenario 3: the received synchronization source indicator si indicates that eNB>GNSS, and the independent synchronization source has lower priority than eNB and GNSS. The priority order regarding several user equipments as synchronization sources is: SS_2$a$>SS_3$a$>SS_2$b$>SS_3$b$>SS_4$b$>S5.

Scenario 4: the received synchronization source indicator si indicates that GNSS>eNB, and the independent synchronization source has lower priority than eNB and GNSS. The priority order regarding several user equipments as synchronization sources is: SS_2$b$>SS_3$b$>SS_4$b$>SS_2$a$>SS_3$a$>S5.

Scenario 5: the synchronization source indicator si is not received, and the independent synchronization source has lower priority than eNB and GNSS. The priority order regarding several user equipments as synchronization sources is: SS_2$a$=SS_2$b$>SS_3$a$=SS_3$b$>SS_4$b$>S5. In this example, signal power may further be taken into consideration to select the appropriate reference synchronization signal.

According to the embodiments shown in FIG. 1-FIG. 5, the synchronization signal received by the wireless communication device 2 may include multiple indicators, including for example a first indicator for indicating in coverage or not, a second indicator for indicating GNSS related or not, a third indicator for indicating the hop count. Each indicator may be implemented by one or more bit. When the wireless communication device 2 performs forwarding operation on the reference synchronization signal Xs, these indicators may be updated in the PSBCH such that the wireless communication device 2 sends the forwarded synchronization signal Y with updated PSBCH.

Figure 6:
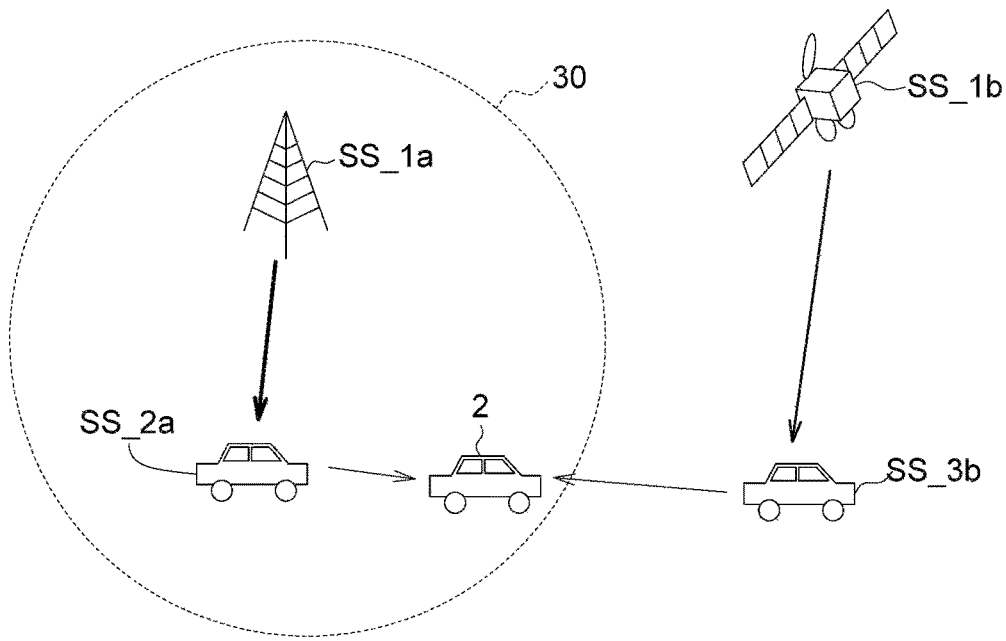
FIG. 6 shows a diagram illustrating the detection of the time gap between two synchronization signals according to an embodiment of this disclosure.

In one embodiment, the wireless communication device 2 may detect a time gap between synchronization signals from two different main synchronization sources. FIG. 6 shows a diagram illustrating the detection of the time gap between two synchronization signals according to an embodiment of this disclosure. The wireless communication device 2 receives a first synchronization signal from the synchronization source SS_2a. The first synchronization signal is related to the base station. The wireless communication device 2 receives a second synchronization signal from the synchronization source SS_3b. The second synchronization signal is related to the GNSS. The wireless communication device 2 may be configured to detect the time gap TG between the first synchronization signal and the second synchronization signal.

Figure 7:
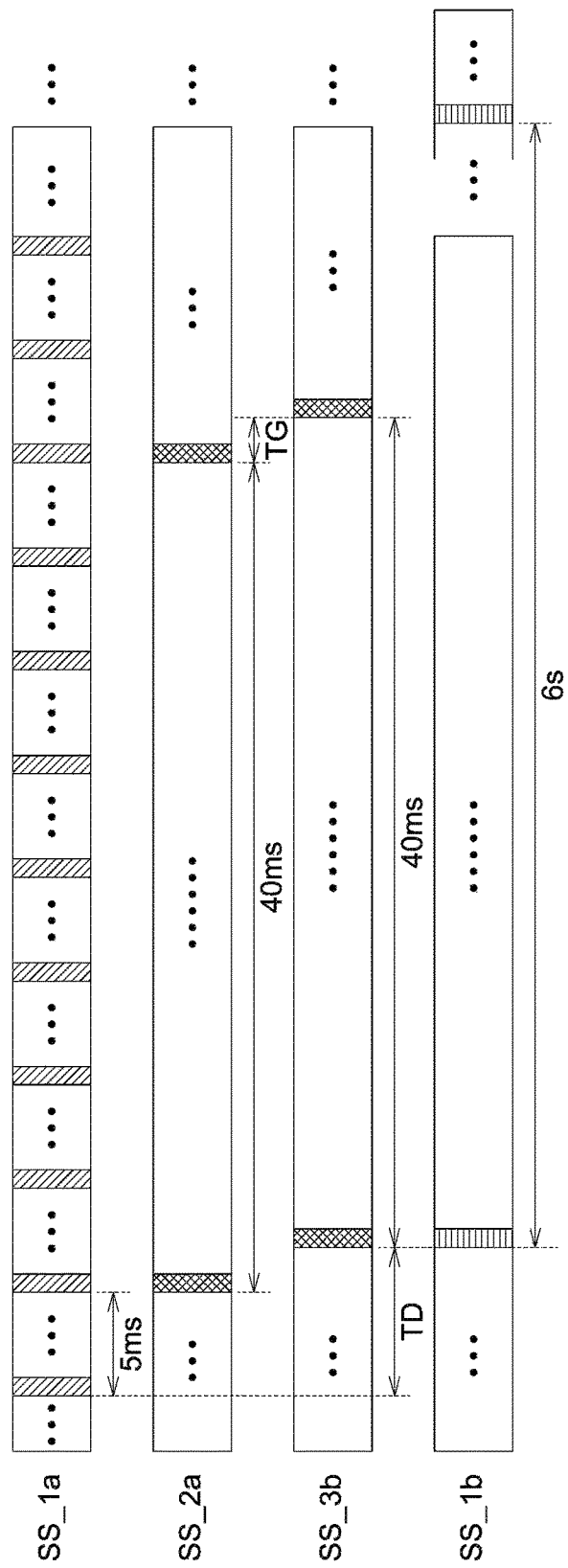
FIG. 7 shows a diagram illustrating the time gap according to an embodiment of this disclosure.

FIG. 7 shows a diagram illustrating the time gap according to an embodiment of this disclosure. The first row depicts the synchronization signal sent from the synchronization source SS_1a, which is the PSS/SSS sent from the eNB with period 5 ms. The bottom row depicts the synchronization signal sent from the synchronization source SS_1b, which is the synchronization signal sent from the GNSS with period 6 s. The second row depicts the synchronization signal forwarded by the synchronization source SS_2a, which is related to the eNB. This D2D synchronization signal has period 40 ms. The third row depicts the synchronization signal forwarded by the synchronization source SS_3b. This synchronization signal is related to the GNSS and has period 40 ms. The wireless communication device 2 receives the synchronization signals from the synchronization source SS_2a and the synchronization source SS_3b. Because the periods of these two synchronization signals are equal, the wireless communication device 2 may detect the time gap TG between these two synchronization signals accordingly. As such, the wireless communication device 2 may obtain the time gap TG information between synchronization signals from two different sources.

In one embodiment, after detecting the time gap TG between the first synchronization signal and the second synchronization signal, the wireless communication device 2 may store this time gap TG information to the PSBCH and forward the synchronization signal such that other user equipments may be able to obtain this time gap TG information. The advantage of doing so may be demonstrated in the following example. Suppose there is one user equipment (for example a car) that originally has only the GNSS timing information. After the user equipment receives the time gap TG information, when the user equipment moves into the coverage of an eNB, the user equipment is able to use the original GNSS timing information and the time gap TG information to obtain the eNB timing information and synchronize to the eNB.

In one embodiment, the wireless communication device 2 may be further configured to calculate a time difference TD between the base station and the GNSS. Please refer to FIG. 7, the wireless communication device 2 may obtain from the PSBCH of the synchronization signal from the synchronization source SS_2a the eNB frame number indicator DFN_eNB, indicating which frame this synchronization signal is in the base station timing. Similarly, the wireless communication device 2 may obtain from the PSBCH of the synchronization signal from the synchronization source SS_3b the GNSS frame number indicator DFN_GNSS, indicating which frame this synchronization signal is in the GNSS timing. In other words, when the wireless communication device 2 forwards the synchronization signal, the wireless communication device 2 updates the frame number indicator DFN_eNB in the synchronization signal such as PSBCH if the synchronization signal is eNB related, and the wireless communication device 2 updates the frame number indicator DFN_GNSS in the synchronization signal such as PSBCH if the synchronization signal is GNSS related. The frame number indicator DFN_eNB and the frame number indicator DFN_GNSS may be represented by multiple bits.

Based on such information, the wireless communication device 2 may calculate the time difference TD between the base station and the GNSS. For example, the calculation may be performed according to equation (1):

$$TD = DFN\_eNB + TG - DFN\_GNSS \qquad \text{-equation (1)}$$

In one embodiment, after calculating the time difference TD, the wireless communication device 2 may be further configured to transmit the time difference TD to the base station. The time difference TD information enables the base station to know the difference between its own timing and the GNSS timing.

In another embodiment, the base station already knows the time difference TD between the base station itself and the GNSS. The user equipment that received the time difference TD from the base station can calculate the time gap TG based on the time difference TD. For example, the calculation may be performed according to equation (2):

$$TG = TD - DFN\_eNB + DFN\_GNSS \qquad \text{-equation (2)}$$

Figure 8:
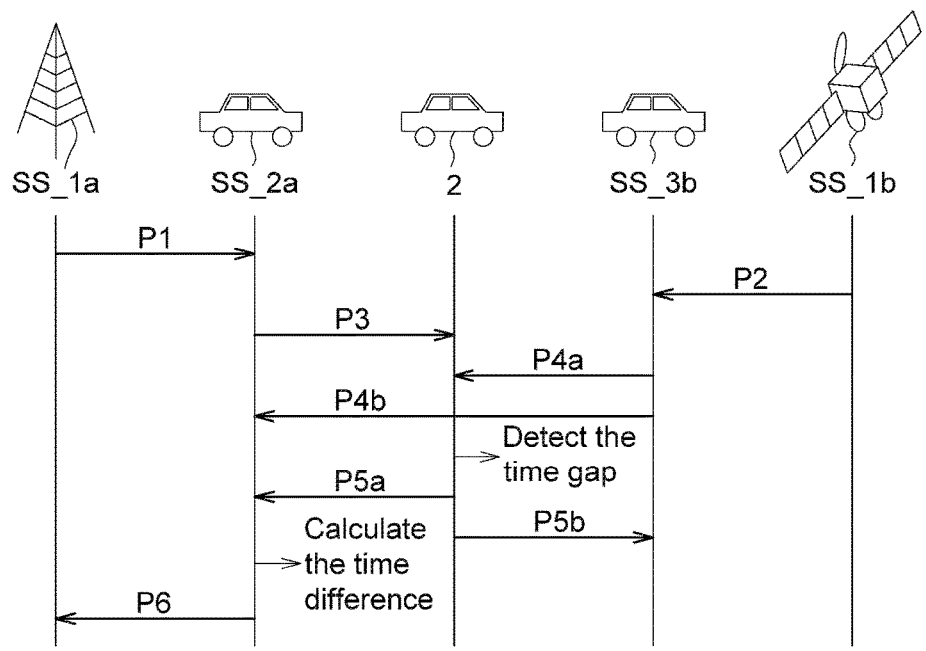
FIG. 8 shows a sequence diagram illustrating detection and transmission of the time difference according to an embodiment of this disclosure.
Figure 9:
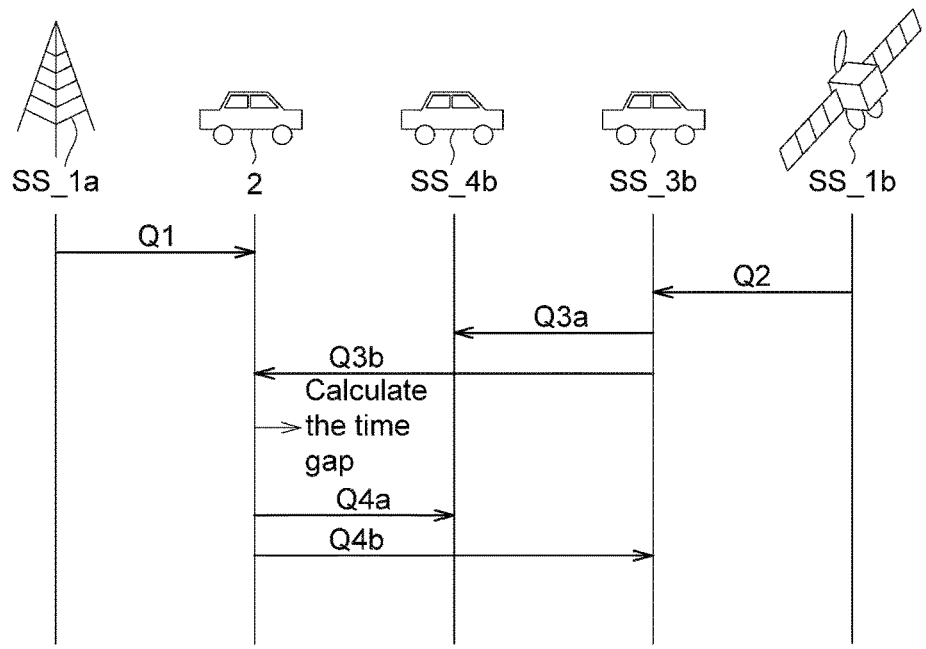
FIG. 9 shows a sequence diagram illustrating detection and transmission of the time gap according to an embodiment of this disclosure.

The multiple synchronization sources shown in FIG. 8 and FIG. 9 and their relative position to the coverage of the base station and signal forwarding relationship may be referred to the example shown in FIG. 1. FIG. 8 shows a sequence diagram illustrating detection and transmission of the time difference according to an embodiment of this disclosure. Step P1: the eNB transmits the synchronization signal (e.g. PSS/SSS). Step P2: the GNSS transmits the synchronization signal. Step P3: the synchronization source SS_2a forwards the synchronization signal from the eNB. Step P4a and P4b: the synchronization source SS_3b forwards the synchronization signal from the GNSS. The wireless communication device 2 receives two synchronization signals related to the eNB and the GNSS respectively in step P3 and step P4a, and is capable of detecting the time gap TG. The wireless communication device 2 may also execute the flowchart shown in FIG. 2 to select and forward the synchronization signal. When the wireless communication device 2 forwards the reference synchronization signal, the detected time gap TG is stored in the PSBCH, and the reference synchronization signal and the corresponding updated PSBCH is transmitted (step P5a and P5b). The synchronization source SS_3b originally has the GNSS timing. After receiving the time gap TG, the synchronization source SS_3b is able to synchronize to the eNB according to the original GNSS timing information and the time gap TG information. After the synchronization source SS_2a in the coverage of the eNB receives the time gap TG, the synchronization source SS_2a may calculate the time difference TD according to the equation (1), and transmit the time difference TD to the eNB through the control channel in step P6.

FIG. 9 shows a sequence diagram illustrating detection and transmission of the time gap according to an embodiment of this disclosure. In this example the eNB knows the time difference TD between itself and the GNSS. Step Q1: the eNB transmits the synchronization signal (e.g. PSS/SSS), and transmits the time difference TD to the wireless communication device 2 through the system information block or the control channel. Step Q2: the GNSS transmits the synchronization signal. Step Q3a and Q3b: the synchronization source SS_3b forwards the synchronization signal from the GNSS. The wireless communication device 2 receives two synchronization signals related to the eNB and the GNSS respectively in step Q1 and step Q3b. The wireless communication device 2 obtains the frame number indicator DFN_eNB from the synchronization signal transmitted from the eNB, and obtains the frame number indicator DFN_GNSS in the step Q3b, and is able to calculate the time gap TG according to the equation (2). The wireless communication device 2 may also execute the flowchart shown in FIG. 2 to select and forward the synchronization signal. When the wireless communication device 2 forwards the reference synchronization signal, the calculated time gap TG is stored in the PSBCH, and the reference synchronization signal and the corresponding updated PSBCH is transmitted (step Q4a and Q4b). The synchronization source SS_4b and SS_3b may obtain the time gap TG information. The synchronization source SS_3b originally has the GNSS timing. After receiving the time gap TG, the synchronization source SS_3b is able to synchronize to the eNB according to the original GNSS timing information and the time gap TG information when the synchronization source SS_3b moves into the coverage of an eNB.

In the several embodiments mentioned above, tasks regarding logic, determination, and arithmetic operation may be executed by the processor 200, such as selecting the reference synchronization signal according to the priority rule, determining whether or not the forwarding criterion is met, detecting/calculating time gap and time difference between synchronization signals from different main synchronization sources. Tasks regarding wireless signal transmission and reception may be executed by the signal transceiver 210, such as receiving the synchronization signals, forwarding the synchronization signal, transmitting the time gap, transmitting the time difference to the base station.

According to the method for transmitting and receiving synchronization signal and the wireless communication device disclosed in the above embodiments, how to select and forward among multiple received synchronization signals can be effectively determined in the D2D and V2V communication environment. Because the reference synchronization signal is selected according to a formulated priority rule, and constraints are imposed on whether or not to forward the reference synchronization signal, the problem of synchronization signal confusion and interference due to multiple synchronization signals in the environment can be prevented. Also the coverage of the synchronization signal can be effectively extended by the forwarding process. In addition, by setting a time gap indicator between synchronization signals from two different main synchronization sources, the user equipment can perform synchronization operation between two main synchronization sources more conveniently, and the base station can obtain the time difference between itself and the GNSS.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for receiving and transmitting synchronization signal, applicable to a wireless communication device, the wireless communication device having a local timing, and the method comprises:
   receiving at least one synchronization signal;
   if a signal power of at least one of the at least one synchronization signal is greater than or equal to a signal power threshold, selecting one of the at least one synchronization signal as a reference synchronization signal according to a priority rule, and synchronizing the local timing to the reference synchronization signal;
   if the signal power of each the synchronization signal is less than the signal power threshold, sending a local synchronization signal according to the local timing; and
   if the reference synchronization signal meets a forwarding criterion, forwarding the reference synchronization signal, wherein the forwarding criterion comprises a power constraint and a hop count constraint,
   wherein the forwarding criterion comprises a hop count of the reference synchronization signal is less than a hop count threshold.

2. The method according to claim 1, wherein the synchronization signal is sent from a transmission source, and the transmission source is a base station, a global navigation satellite system, or a user equipment.

3. The method according to claim 2, wherein the power constraint is determined according to the transmission source of the reference synchronization signal.

4. The method according to claim 2, wherein the forwarding criterion comprises:
   the signal power of the reference synchronization signal is between a power lower bound and a power upper bound;
   wherein the hop count represents a number of forwarding operations that the reference synchronization signal has experienced after being sent from the base station or the global navigation satellite system.

5. The method according to claim 2, wherein the priority rule comprises:
   prioritizing either a synchronization signal related to the base station or a synchronization signal related to the global navigation satellite system according to a synchronization source indicator; and
   assigning equal priority order to the synchronization signal related to the base station and the synchronization signal related to the global navigation satellite system when the synchronization source indicator is not received;
   wherein the synchronization source indicator is transmitted from the base station to the wireless communication device.

6. The method according to claim 2, wherein the priority rule comprises:
   assigning a higher priority order to a synchronization signal whose transmission source is in a coverage of the base station than to a synchronization signal whose transmission source is out of the coverage of the base station.

7. The method according to claim 2, wherein the priority rule comprises:
   based on a hop count of the at least one synchronization signal, sorting the hop count in an ascending order, and assigning a higher priority order to a synchronization signal having the smaller hop count than to a synchronization signal having the larger hop count.

8. The method according to claim 2, wherein the priority rule comprises:
   based on the signal power of the at least one synchronization signal, sorting the signal power in a descending order, and assigning a higher priority order to a synchronization signal having the larger signal power than to a synchronization signal having the smaller signal power.

9. The method according to claim 2, wherein the at least one synchronization signal comprises a first synchronization signal and a second synchronization signal, the first synchronization signal is related to the base station, the second synchronization signal is related to the global navigation satellite system, the method further comprises:
  detecting a time gap between the first synchronization signal and the second synchronization signal.

10. The method according to claim 9, further comprising transmitting the time gap.

11. The method according to claim 9, further comprising:
  obtaining a first frame number of the first synchronization signal;
  obtaining a second frame number of the second synchronization signal; and
  calculating a time difference between the base station and the global navigation satellite system according to the first frame number, the second frame number, and the time gap.

12. The method according to claim 11, further comprising transmitting the time difference to the base station.

13. The method according to claim 9, wherein the transmission source of the first synchronization signal is the base station, and the step of detecting the time gap between the first synchronization signal and the second synchronization signal comprises:
  obtaining a time difference between the base station and the global navigation satellite system from the base station;
  obtaining a first frame number of the first synchronization signal;
  obtaining a second frame number of the second synchronization signal; and
  calculating the time gap according to the first frame number, the second frame number, and the time difference between the base station and the global navigation satellite system.

14. A wireless communication device, the wireless communication device having a local timing, the wireless communication device comprising:
  a signal transceiver, configured to receive at least one synchronization signal; and
  a processor, coupled to the signal transceiver, the processor configured to perform the following operations:
  if determining that a signal power of at least one of the at least one synchronization signal is greater than or equal to a signal power threshold, selecting one of the at least one synchronization signal as a reference synchronization signal according to a priority rule, and synchronizing the local timing to the reference synchronization signal;
  if determining that the signal power of each the synchronization signal is less than the signal power threshold, sending a local synchronization signal according to the local timing by the signal transceiver; and
  if determining that the reference synchronization signal meets a forwarding criterion, forwarding the reference synchronization signal by the signal transceiver, wherein the forwarding criterion comprises a power constraint and a hop count constraint,
  wherein the forwarding criterion comprises a hop count of the reference synchronization signal is less than a hop count threshold.

15. The wireless communication device according to claim 14, wherein the synchronization signal is sent from a transmission source, the transmission source is a base station, a global navigation satellite system, or a user equipment.

16. The wireless communication device according to claim 15, wherein the power constraint is determined according to the transmission source of the reference synchronization signal.

17. The wireless communication device according to claim 15, wherein the forwarding criterion comprises:
  the signal power of the reference synchronization signal is between a power lower bound and a power upper bound;
  wherein the hop count represents a number of forwarding operations that the reference synchronization signal has experienced after being sent from the base station or the global navigation satellite system.

18. The wireless communication device according to claim 15, wherein the priority rule comprises:
  prioritizing either a synchronization signal related to the base station or a synchronization signal related to the global navigation satellite system according to a synchronization source indicator; and
  assigning equal priority order to the synchronization signal related to the base station and the synchronization signal related to the global navigation satellite system when the synchronization source indicator is not received;
  wherein the synchronization source indicator is transmitted from the base station to the wireless communication device.

19. The wireless communication device according to claim 15, wherein the priority rule comprises:
  assigning a higher priority order to a synchronization signal whose transmission source is in a coverage of the base station than to a synchronization signal whose transmission source is out of the coverage of the base station.

20. The wireless communication device according to claim 15, wherein the priority rule comprises:
  based on a hop count of the at least one synchronization signal, sorting the hop count in an ascending order, and assigning a higher priority order to a synchronization signal having the smaller hop count than to a synchronization signal having the larger hop count.

21. The wireless communication device according to claim 15, wherein the priority rule comprises:
  based on the signal power of the at least one synchronization signal, sorting the signal power in a descending order, and assigning a higher priority order to a synchronization signal having the larger signal power than to a synchronization signal having the smaller signal power.

22. The wireless communication device according to claim 15, wherein the at least one synchronization signal comprises a first synchronization signal and a second synchronization signal, the first synchronization signal is related to the base station, the second synchronization signal is related to the global navigation satellite system, the processor is further configured to perform the following operation:
  detecting a time gap between the first synchronization signal and the second synchronization signal.

23. The wireless communication device according to claim 22, wherein the signal transceiver is further configured to transmit the time gap.

24. The wireless communication device according to claim 22, wherein the processor is further configured to perform the following operations:
  obtaining a first frame number of the first synchronization signal;

obtaining a second frame number of the second synchronization signal; and calculating a time difference between the base station and the global navigation satellite system according to the first frame number, the second frame number, and the time gap.

25. The wireless communication device according to claim 24, wherein the signal transceiver is further configured to transmit the time difference to the base station.

26. The wireless communication device according to claim 22, wherein the transmission source of the first synchronization signal is the base station, and the processor is further configured to perform the following operations:

obtaining a time difference between the base station and the global navigation satellite system from the base station;

obtaining a first frame number of the first synchronization signal;

obtaining a second frame number of the second synchronization signal; and calculating the time gap according to the first frame number, the second frame number, and the time difference between the base station and the global navigation satellite system.

* * * * *